US010035432B2

(12) United States Patent
Fujii et al.

(10) Patent No.: US 10,035,432 B2
(45) Date of Patent: Jul. 31, 2018

(54) SEAT OCCUPANCY DETERMINATION APPARATUS

(71) Applicant: AISIN SEIKI KABUSHIKI KAISHA, Kariya-shi (JP)

(72) Inventors: Hiroyuki Fujii, Kariya (JP); Yoshiaki Tomatsu, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 907 days.

(21) Appl. No.: 13/771,784

(22) Filed: Feb. 20, 2013

(65) Prior Publication Data
US 2013/0218487 A1 Aug. 22, 2013

(30) Foreign Application Priority Data

Feb. 22, 2012 (JP) ................................. 2012-036431

(51) Int. Cl.
*B60N 2/00* (2006.01)
*B60R 21/015* (2006.01)
*B60R 22/48* (2006.01)

(52) U.S. Cl.
CPC .......... *B60N 2/002* (2013.01); *B60R 21/0152* (2014.10); *B60R 22/48* (2013.01); *B60R 2022/4816* (2013.01); *B60R 2022/4858* (2013.01)

(58) Field of Classification Search
CPC . B60N 2/002; B60R 21/01556; B60R 21/015; B60R 21/01546; B60R 21/01512
See application file for complete search history.

(56) References Cited

U.S. PATENT DOCUMENTS

| 6,748,814 | B2 | 6/2004 | Ishida et al. |
| 8,296,099 | B2 | 10/2012 | Ito et al. |
| 2006/0265113 | A1* | 11/2006 | Kobayashi ........ B60R 21/01556 701/45 |

(Continued)

FOREIGN PATENT DOCUMENTS

| JP | 9-207638 | 8/1997 |
| JP | 2002-318113 | 10/2002 |

(Continued)

*Primary Examiner* — Mohamed Charioui
*Assistant Examiner* — Catherine Rastovski
(74) *Attorney, Agent, or Firm* — Oblon, McClelland, Maier & Neustadt, L.L.P.

(57) ABSTRACT

A seat occupancy determination apparatus includes a seatbelt attachment detection device, a first load detection device and a second load detection device arranged under a vehicle seat and each detecting part of a load acting on the vehicle seat, a control processor obtaining a first load value and a second load value, the control processor including a sum load value calculation portion computing a sum load value, a no-occupancy determination portion, a slope way determination portion determining that a vehicle is stopped on a slope way, a seatbelt attachment determination portion, a tentative determination portion tentatively making a seat occupancy determination, a forward movement determination portion determining that the vehicle starts moving forward and runs steadily on a flat ground, and a definite determination portion determining that an adult is seated and determining that a child safety seat is fastened.

6 Claims, 7 Drawing Sheets

(56) References Cited

U.S. PATENT DOCUMENTS

| | | | |
|---|---|---|---|
| 2011/0005843 A1* | 1/2011 | Ito | B60N 2/002 177/136 |
| 2011/0010037 A1 | 1/2011 | Inayoshi et al. | |
| 2011/0010056 A1* | 1/2011 | Inayoshi | B60N 2/002 701/45 |
| 2011/0040451 A1* | 2/2011 | Lee | B60R 21/01516 701/45 |

FOREIGN PATENT DOCUMENTS

| | | |
|---|---|---|
| JP | 3991740 | 8/2007 |
| JP | 2011-16396 | 1/2011 |

\* cited by examiner

SEAT OCCUPANCY DETERMINATION APPARATUS

CROSS REFERENCE TO RELATED APPLICATIONS

This application is based on and claims priority under 35 U.S.C. § 119 to Japanese Patent Application 2012-036431, filed on Feb. 22, 2012, the entire content of which is incorporated herein by reference.

TECHNICAL FIELD

This disclosure generally relates to a seat occupancy determination apparatus.

BACKGROUND DISCUSSION

In recent years, in order to enhance performances of various safety devices, for example, airbags and seatbelts that are provided at a vehicle, operations of these safety devices may be controlled according to a weight of an occupant seated in a seat. For example, when the occupant is seated in the seat without wearing the seatbelt, a warning lamp warns that "seatbelt is unbuckled" after seating is detected. Further, the law stipulates that the airbag is to be deployed at a vehicle collision when an adult is seated in a passenger seat. The law further stipulates that a deployment of the airbag should be prohibited in a case where a child safety seat is fixed to the passenger seat facing backward so that an infant or a child in the child safety seat and a driver can see each other because an impact by the deployment of the airbag causes adverse effects to the infant or the child. In these cases, a weight of a smaller female adult is applied as a criterion for determining whether an occupant is an adult, and a criterion for determination on the child safety seat is also stipulated. Thus, in order to ensure safety, it is important that a load of, for example, the occupant in the seat is detected and that a state in the seat is determined correctly.

An example of a known occupant detection apparatus is disclosed in JPH9-207638A (which will be hereinafter referred to as Patent reference 1), which distinguishes whether or not an occupant is in a seat by detecting a load acting on the seat. According to the known occupant detection apparatus disclosed in Patent reference 1, a load sensor is provided at each of two seat attaching portions among plural seat attaching portions. It is distinguished whether or not the occupant is in the seat on the basis of a sum of two load values that are obtained from the respective load sensors. Thus, according to Patent reference 1, the known occupant detection apparatus includes the load sensors arranged at the only two minimum necessary seat attaching positions from among usual four positions, and therefore the occupant detection apparatus which has a simple configuration and is inexpensive as a whole is provided.

An example of a known seating determination apparatus is disclosed in JP2011-16396A (which will be hereinafter referred to as Patent reference 2), which detects a load acting on a seat to determine whether or not a child safety seat is attached to the seat. According to the known seating determination apparatus disclosed in the Patent reference 2, a load sensor is provided at each of two seat attaching portions at left and right sides (especially, the two portions at left and right sides of a rear portion) among plural seat attaching portions. It is distinguished whether or not a child safety seat is attached to the seat by detecting load fluctuations characteristically generated while the child safety seat is being fastened to the seat on the basis of a sum of two load values and a difference between the two load values. Thus, according to Patent reference 2, the known seating determination apparatus includes the load sensors arranged at the only two minimum necessary positions at the left and right sides, and therefore the seating determination apparatus which has a simple configuration and is inexpensive is provided.

According to each of the above-described known apparatuses of Patent reference 1 and Patent reference 2, in order to reduce costs and weight of the apparatus, the number of the load sensors provided is two and the occupant is distinguished with the two load sensors. However, according to the above-described manner in which the load sensors are attached to the two seat attaching positions among plural seat attaching portions, load values detected by the load sensors may fluctuate toward a negative side. Specifically, in a case, for example, where a vehicle is stopped on an inclined location such as a slope way so that a front-rear direction of the vehicle and an inclination direction make a large angle therebetween and where the load sensors are at that time positioned higher on the inclination relative to the seat, a load which is given by a seat body to the load sensors is reduced. At this time, in a case where an adult is seated on a seating surface of the seat, the buttocks of the adult slide downwardly along the inclination of the seating surface, and thus the center of gravity of the adult moves downwardly. As a result, the detected load of the load sensors further fluctuate toward the negative side. On the other hand, in a case where a child safety seat is fastened to the seat, a large fluctuation of the center of gravity of the child safety seat is not generated by the inclination of the vehicle. Thus, the load which is given by the child safety seat and by the seat body to the load sensors is decreased only slightly corresponding to an amount of the inclination of the vehicle. Accordingly, a difference between the load which is outputted by the load sensors when the adult is seated in the seat and which largely fluctuates toward the negative side, and the load which is outputted by the load sensors when the child safety seat is attached to the seat and which slightly fluctuates toward the negative side is smaller than an actual difference. Consequently, it is difficult to distinguish the adult seated in the seat and the child safety seat attached to the seat.

A need thus exists for a seat occupancy determination apparatus which is not susceptible to the drawback mentioned above.

SUMMARY

According to an aspect of this disclosure, a seat occupancy determination apparatus includes a seatbelt attachment detection device detecting engagement and disengagement of a tongue plate of a seatbelt and a buckle of the seatbelt relative to each other, a first load detection device and a second load detection device which are arranged under a vehicle seat, at two of support portions each supporting the vehicle seat in a manner that the first load detection device and the second load detection device are spaced away from each other, each of the first load detection device and the second load detection device detecting part of a load acting on the vehicle seat, a control processor obtaining a first load value and a second load value which are detected at the first load detection device and the second load detection device, respectively and performing calculation, the control processor including, a sum load value calculation portion computing a sum load value that is computed by adding the first load value and the second load value to each other, a no-occupancy determination portion determining that the vehicle seat is in a no-occupancy state when the tongue plate is disengaged from the buckle and the sum load value is equal to or smaller than a no-occupancy determination threshold), a slope way determination portion determining that a vehicle is stopped on a slope way while being inclined in a manner that an attachment position of each of the first load detection device and the second load detection device is positioned at an upper side of an inclination relative to the vehicle seat in a case where it is determined by the no-occupancy determination portion that the vehicle seat is in the no-occupancy state, a seatbelt attachment determination portion determining that the seatbelt is fastened when it is detected by the seatbelt attachment detection device that the tongue plate engages with the buckle after the determination is made by the slope way determination portion, a tentative determination portion tentatively making a seat occupancy determination after it is determined by the slope way determination portion that the vehicle is stopped on the slope way while being inclined and it is determined by the seatbelt attachment determination portion that the tongue plate engages with the buckle, a forward movement determination portion determining that the vehicle starts moving forward and runs steadily on a flat ground, and a definite determination portion determining that an adult is seated in the vehicle seat when the sum load value computed by the sum load value calculation portion is equal to or larger than an adult determination threshold value that is set in advance and determining that a child safety seat is fastened to the vehicle seat when the sum load value is smaller than a child safety seat determination threshold value that is set in advance, the definite determination portion making the determination after it is determined by the forward movement determination portion that the vehicle starts moving forward and runs steadily on the flat ground.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
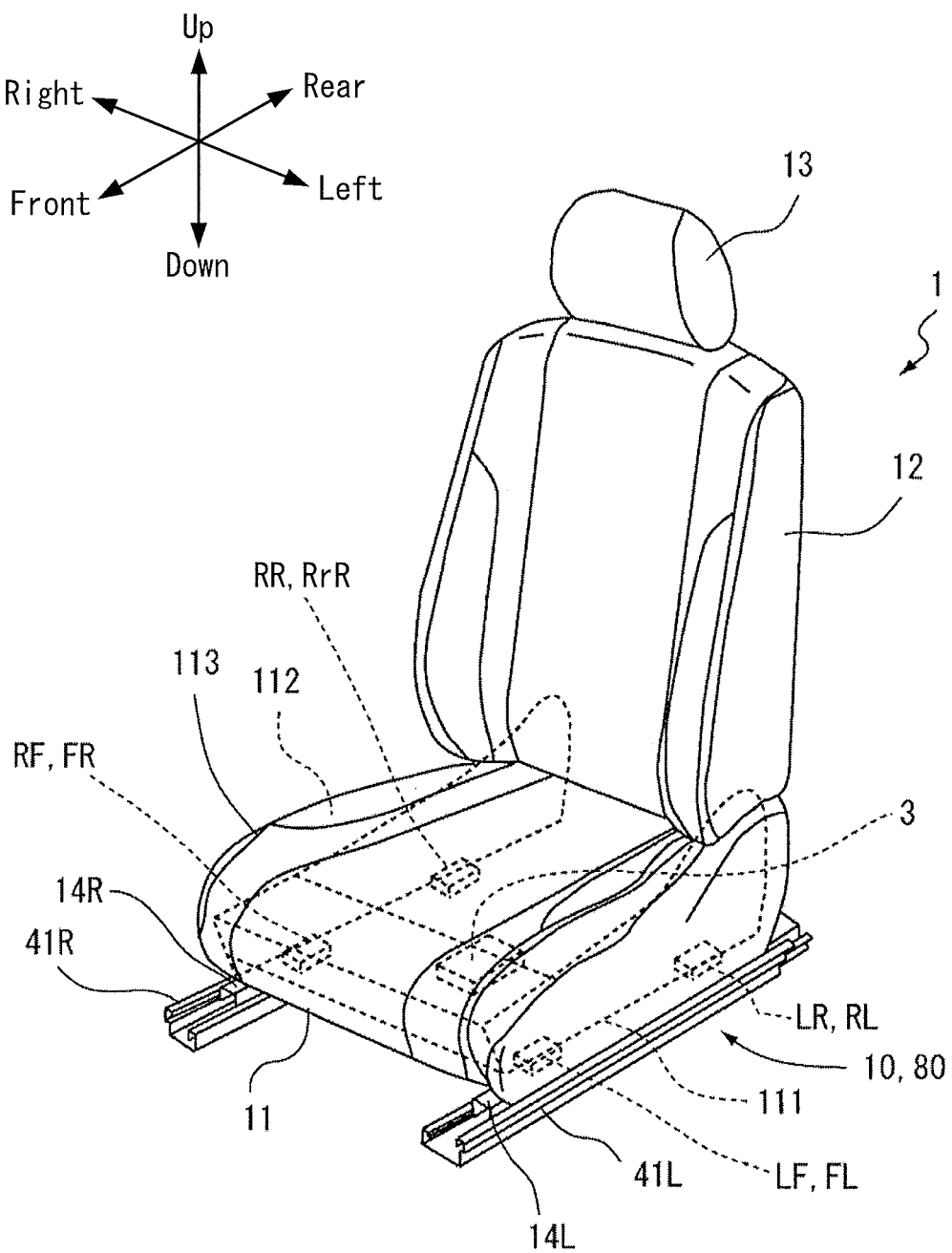
FIG. 1 is a perspective view illustrating a vehicle seat provided with a seat occupancy determination apparatus according to a first embodiment disclosed here.

A seat occupancy determination apparatus 10 of a first embodiment of this disclosure, which is applied to a vehicle seat 1, will be explained with reference to drawings. In this disclosure, directions of front-rear, left-right, up-down and derivatives thereof correspond to respective directions of a vehicle, which are viewed by an occupant seated in the vehicle seat 1 as illustrated in FIG. 1. In this embodiment, the vehicle on which the seat occupancy determination apparatus 10 is mounted is a left-hand drive vehicle and the vehicle seat 1 on which the seat occupancy determination apparatus 10 is mounted is a passenger seat.

As illustrated in FIG. 1, the vehicle seat 1 for the passenger seat is provided with a seat cushion 11 on which the occupant is seated, and a seatback 12 serving as a backrest for the occupant and attached to a rear end portion of the seat cushion 11 so as to be pivotable in the front-rear direction. A headrest 13 supporting a head portion of the occupant is attached an upper end of the seatback 12.

The seat cushion 11 includes a seat frame 111 formed in a three-sided rectangular shape when viewed from upward, a pad member 112 arranged above the seat frame 111 and a surface cover 113 covering a surface of the pad member 112. A pair of upper rails 14L, 14R, which are arranged at left and right sides respectively for supporting the seat frame 111, is fixed to the seat frame 111 at four support portions located in the front-rear direction and the left-right direction. In this embodiment, each of the four support portions is a part of the respective upper rails 14L, 14R, however, a separate member from the upper rails 14L, 14R, for example, a bracket, may be used as the support portion. The pair of upper rails 14L, 14R respectively engages with a pair of lower rails 41L, 41R fixed to a floor 4 of the vehicle so that the pair of upper rails 14L, 14R is slidable in the front-rear direction relative to the pair of lower rails 41L, 41R. Thus, the vehicle seat 1 is configured to move on the floor 4 in the front-rear direction and to be fixed at a position desired by the occupant.

Figure 3:
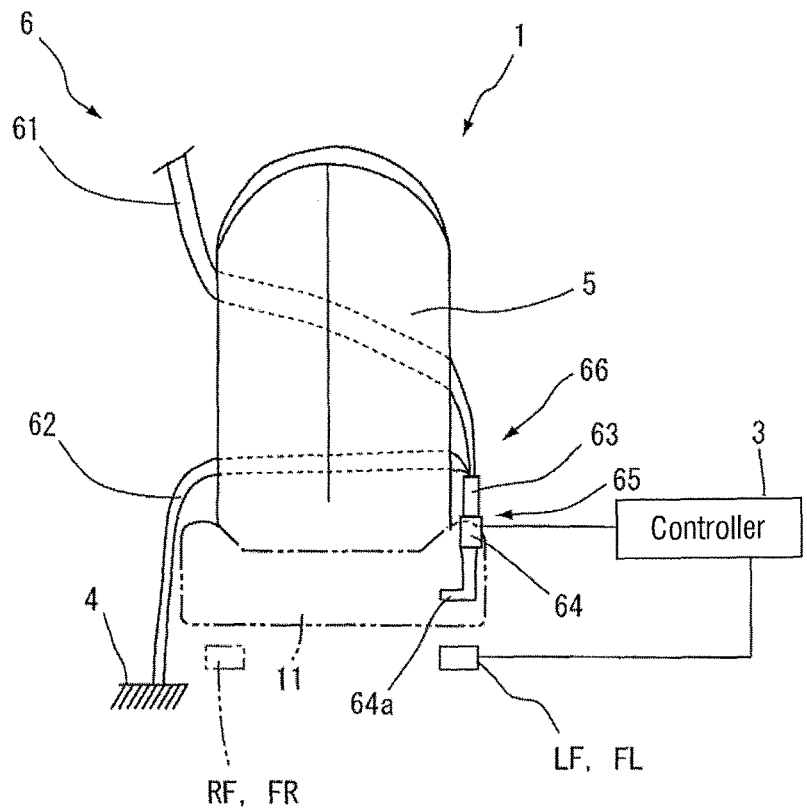
FIG. 3 is a simplified view for explaining a child safety seat attached state according to the embodiment.

As illustrated in FIG. 3 where the vehicle seat 1 to which a child safety seat 5 is fastened is viewed from the front, a seatbelt device 6 is provided at the vehicle seat 1. The seatbelt device 6 includes a shoulder strap 61, a lap strap 62 and a buckle 64. The buckle 64 constitutes a buckle switch 65 (i.e., a seatbelt attachment detection device) by engaging with and disengaging from a tongue plate 63. One end portion of the shoulder strap 61 and one end portion of the lap strap 62 are connected to each other by the tongue plate 63. A retractor serving as a winding device is arranged inside a pillar positioned at a right side relative to the vehicle seat 1. An upper end of the shoulder strap 61 is connected to the retractor, and thus the shoulder strap 61 may be pulled out of the retractor against a winding force by the retractor.

On the other hand, the other end portion of the lap strap 62 is connected to the floor 4 of the vehicle and fixed thereto at the right side of the vehicle seat 1. The buckle 64 is supported to a rear left side of the vehicle seat 1 at a supported portion 64a and includes an opening hole opening upwardly for receiving therein the tongue plate 63. The tongue plate 63, which is connected to the shoulder strap 61 and to the lap strap 62, is inserted from the opening hole into the buckle 64 and engages with the buckle 64 so as to be fastened threat. Hereunder, the shoulder strap 61 and the lap strap 62 will be comprehensively referred to as a seatbelt 66.

Figure 2:
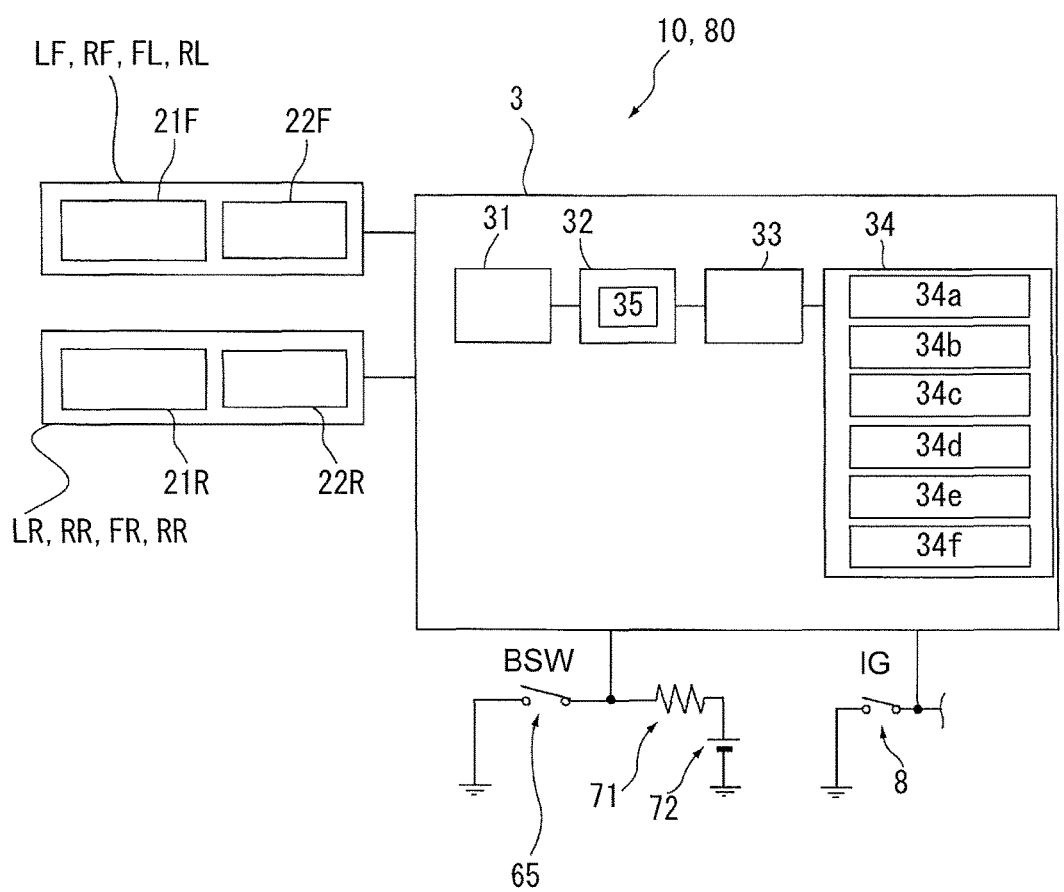
FIG. 2 is a block diagram schematically illustrating the seat occupancy determination apparatus.

As illustrated in FIG. 2, in a case where the tongue plate 63 and the buckle 64, both of which constitute the seatbelt device 6, are disengaged from each other, the buckle switch 65 is in an open state (that is, off). When the tongue plate 63 and the buckle 64 are brought to engage with each other, the buckle switch 65 comes to be in a closed state (that is, on), and a controller 3 detects that the seatbelt device 6 is fastened, that is, the buckle switch 65 of the controller 3 detects that the seatbelt device 6 is fastened.

Next, the seat occupancy determination apparatus 10 will be explained with reference to FIGS. 1 to 3. The seat occupancy determination apparatus 10 detects, for example, whether an adult is seated in the vehicle seat 1 or the child safety seat 5 is fastened to the vehicle seat 1. The seat occupancy determination apparatus 10 includes the buckle switch 65 (refer to FIGS. 2 and 3) that constitutes the seatbelt attachment detection device, a left front load sensor LF (i.e., a first load detection device), a left rear load sensor LR (i.e., a second load detection device) and the controller 3 (i.e., a control processor).

The left front load sensor LF and the left rear load sensor LR, which are provided as a pair in the front-rear direction, are arranged under the vehicle seat 1 at one of the left and right sides (in the embodiment, at the left side). In other words, the left front load sensor LF and the left rear load sensor LR are arranged at the respective support portions positioned between the seat frame 111 of the vehicle seat 1 and the upper rail 14L at the left side so as to be spaced away from each other by a predetermined distance in the front-rear direction. As illustrated in FIG. 1, the left front load sensor LF is arranged forward relative to a center of the seat cushion 11 in the front-rear direction. The left rear load sensor LR is arranged rearward relative to the center of the seat cushion 11 in the front-rear direction.

Each of the left front load sensor LF and the left rear load sensor LR is a load sensor constituted by, for example, a strain gauge. The left front load sensor LF and the left rear load sensor LR detect a load applied downwardly to the seat cushion 11 when, for example, an occupant is seated in the vehicle seat 1 or when baggage is placed on the vehicle seat 1. At a time of shipment of the vehicle, each of a left front load value fLF and a left rear load value fLR is reset to be zero (zero reset) in a state where the vehicle is placed in a horizontal state. According to this embodiment, a type, a model and a detection principle of the left front load sensor LF and the left rear load sensor LR are not specified.

The left front load sensor LF detects the left front load value fLF (i.e., a first load value) that is borne by a front left portion of the seat cushion 11. In a similar manner thereto, the left rear load sensor LR detects the left rear load value fLR (i.e., a second load value) that is borne by a rear left portion of the seat cushion 11. That is, each of the left front load sensor LF and the left rear load sensor LR detects part of the load acting on the seat cushion 11 of the vehicle seat 1.

As illustrated in FIG. 2, the left front load sensor LF is provided with a sensor portion 21F and an amplifier portion 22F amplifying a detection signal generated by the sensor portion 21F. The left rear load sensor LR is provided with a sensor portion 21R and an amplifier portion 22R amplifying a detection signal generated by the sensor portion 21R. Each of the sensor portions 21F, 21R is constituted by a Wheatstone bridge circuit configured by four strain gauges.

The controller 3 is connected to each of the left front load sensor LF and the left rear load sensor LR. The controller 3 is provided with an A/D converter 31 performing a digital conversion on an analog detection signal from the left front load sensor LF and the left rear load sensor LR, a calculation portion 32 performing calculation on the basis of the digital-converted signal, a memory portion 33 storing results of the calculation performed at the calculation portion 32 and various data which are needed for the determination of an occupancy state, and a determination portion 34 determining whether the child safety seat is attached (fastened) to the vehicle seat 1 or an adult is seated in the vehicle seat 1 on the basis of, for example, the results of the calculation performed at the calculation portion 32.

The calculation portion 32 includes a front and rear sum load value calculation portion 35 (i.e., a sum load value calculation portion). The front and rear sum load value calculation portion 35 computes a left front and left rear sum load value (fLF+fLR) (i.e., a sum load value) by adding the left front load value fLF detected by the left front load sensor LF and the left rear load value fLR detected by the left rear load sensor LR to each other. The calculated left front and left rear sum load value fLF+fLR is stored at the memory portion 33, and then is transmitted to the determination portion 34.

Figure 5:
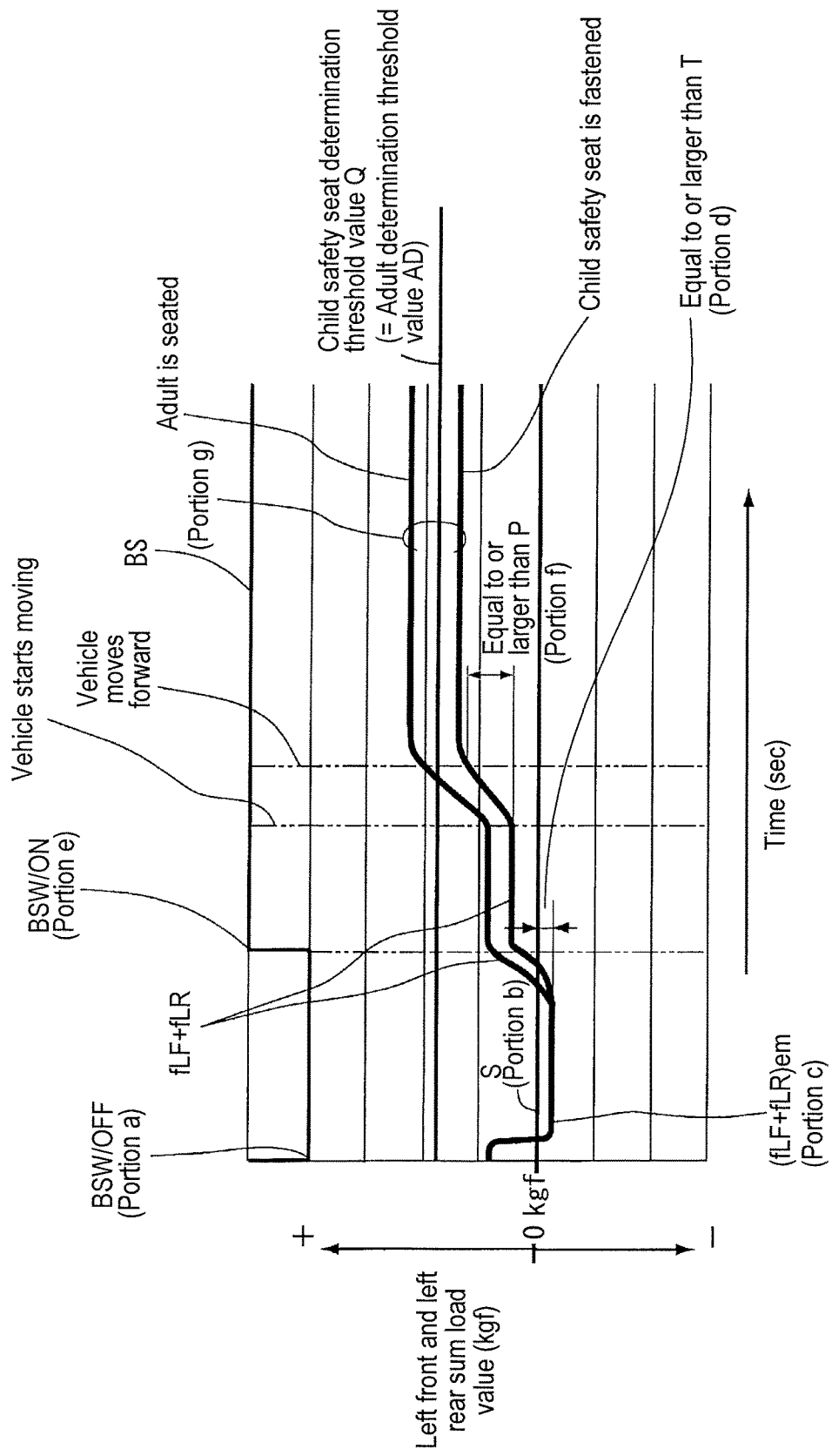
FIG. 5 is a diagram illustrating an example correlation between time and the characteristics of the left front and left rear sum load value, in a state where the adult is seated in the vehicle seat and the child safety seat is attached to the vehicle seat according to the embodiment.

The memory portion 33 stores therein a child safety seat determination threshold value Q set in advance, which is illustrated in FIG. 5. The child safety seat determination threshold value Q refers to a threshold value for the determination on the attachment (fastening) of the child safety seat 5 to the vehicle seat 1 according to a magnitude of the calculated left front and left rear sum load value (fLF+fLR). That is, in a case where the left front and left rear sum load value (fLF+fLR) is smaller than the child safety seat determination threshold value Q, it is determined that the child safety seat 5 is fastened to the vehicle seat 1. In addition, the memory portion 33 stores therein an adult determination threshold value AD that is set in advance. The adult determination threshold value AD refers to a threshold value for determining that an adult is seated in the vehicle seat 1 in a case where the calculated left front and left rear sum load value (fLF+fLR) is equal to or larger than the adult determination threshold value AD. The adult determination threshold value AD may be set to be equal to the child safety seat determination threshold value Q. In this embodiment, the adult determination threshold value AD is set to be equal to the child safety seat determination threshold value Q. The child safety seat determination threshold value Q (the adult determination threshold value AD) may be set in an arbitrary manner. For example, the child safety seat determination threshold value Q (the adult determination threshold value AD) may be set at a substantially intermediate point between an average value of a left front and left rear sum load value (fLF+fLR) Ad when an adult is seated in the vehicle seat 1 and an average value of a left front and left rear sum load value (fLF+fLR) Ch when the child safety seat 5 is attached to the vehicle seat 1 when the vehicle is in the horizontal state. By using the child safety seat determination threshold value Q (the adult determination threshold value AD) set in the above-described manner, usually, distinction between the adult and the child safety seat 5 is performed in a stable manner with less erroneous determination. However, the above-described way of setting the child safety seat determination threshold value Q (the adult determination threshold value AD) is an example, and is not limited thereto. The child safety seat determination threshold value Q (the adult determination threshold value AD) may be determined in an arbitrary manner as long as the adult and the child safety seat 5 are distinguishable from each other.

The determination portion 34 includes a no-occupancy determination portion 34a, a slope way determination portion 34b, a seatbelt attachment determination portion 34c, a tentative determination portion 34d, a forward movement determination portion 34e and a definite determination portion 34f. The no-occupancy determination portion 34a determines that the vehicle seat 1 is in a no-occupancy state in a case where the tongue plate 63 disengages from the buckle 64 and therefore the buckle switch 65 serving as the seatbelt attachment detection device is in an OFF state, and the left front and left rear sum load value (fLF+fLR) is equal to or smaller than a no-occupancy determination threshold S. In this embodiment, the no-occupancy determination threshold S is set at zero kilograms, however, the no-occupancy determination threshold S may be set at an arbitrary value.

Specific examples where the determination portion 34 operates will be explained hereunder. One example may be a case where an adult occupant is seated in the vehicle seat 1 or the child safety seat 5 is fastened to the vehicle seat 1, and then the adult occupant gets off the vehicle, that is, the adult occupant leaves the vehicle seat 1, or the child safety seat 5 is removed from the vehicle seat 1. In these cases, it is detected from the disengagement of the tongue plate 63 from the buckle 64 that the buckle switch 65 is in the OFF state. After this, the left front and left rear sum load value (fLF+fLR) decreases and comes to be equal to or smaller than the non-occupancy determination threshold S as the adult occupant gets off the vehicle or the child safety seat 5 is removed from the vehicle seat 1.

Another example may be a case where an adult is seated in the vehicle seat 1 without fastening the seatbelt device 6, and then the adult gets off the vehicle. In this case, it is already detected that the buckle switch 65 is in the OFF state when the adult is on the vehicle. After this, the left front and left rear sum load value (fLF+fLR) decreases to be equal to or smaller than the non-occupancy determination threshold S as the adult occupant gets off the vehicle.

Another example may be a case where the vehicle seat 1 is originally empty, that is, none is on the vehicle seat 1. In this case, it is already detected that the buckle switch 65 is in the OFF state and that the left front and left rear sum load value (fLF+fLR) is equal to or smaller than the non-occupancy determination threshold S.

The no-occupancy determination portion 34a determines that the vehicle seat 1 is in the no-occupancy state in the aforementioned cases. As explained above, the no-occupancy determination portion 34a determines that the vehicle seat 1 is in the no-occupancy state in a case where it is confirmed that the buckle switch 65 is in the OFF state and that the left front and left rear sum load value (fLF+fLR) is equal to or smaller than the non-occupancy determination threshold S. However, the no-occupancy determination portion 34a may determine that the vehicle seat 1 is in the no-occupancy state in a case where it is confirmed that the left front and left rear sum load value (fLF+fLR) is equal to or smaller than the non-occupancy determination threshold S without confirming whether the buckle switch 65 is in the OFF state. In this case, reasonable effects will be obtained.

As illustrated in FIG. 2, the buckle switch 65 (BSW) is connected to the controller 3. A battery 72 of the vehicle is connected to the buckle switch 65 via a direct current resistance 71. When the buckle switch 65 is in an open state (the OFF state), the controller 3 detects voltage (high) at the positive side terminal of the battery 72 because current does not flow through the direct current resistance 71. When the buckle switch 65 is in a closed state (an ON state), the current flows through the direct current resistance 71 and thus the controller 3 detects a voltage drop (low) by the direct current resistance 71. Thus, the controller 3 detects that the buckle 64 engages with the tongue plate 63 and the seatbelt device 6 is fastened.

Further, an ignition switch 8 (IG) of the vehicle is connected to the controller 3. The controller 3 detects whether the ignition switch 8 is in an ON state or an OFF state.

The slope way determination portion 34b determines whether a location at which the vehicle is stopped is a slope way or a flat ground, that is, whether or not the vehicle is stopped while being inclined, on the basis of the load applied to the left front and left rear load sensors LF, LR both arranged under the vehicle seat 1. Predetermined conditions of the vehicle in a stopped state are, for example, that the vehicle is stopped in a manner that the front-rear direction of the vehicle makes a large angle (substantially right angle) relative to an inclination direction of the slope way, and that the left front and left rear load sensors LF, LR are positioned at an upper side of the inclination relative to the vehicle seat 1.

Figure 4:
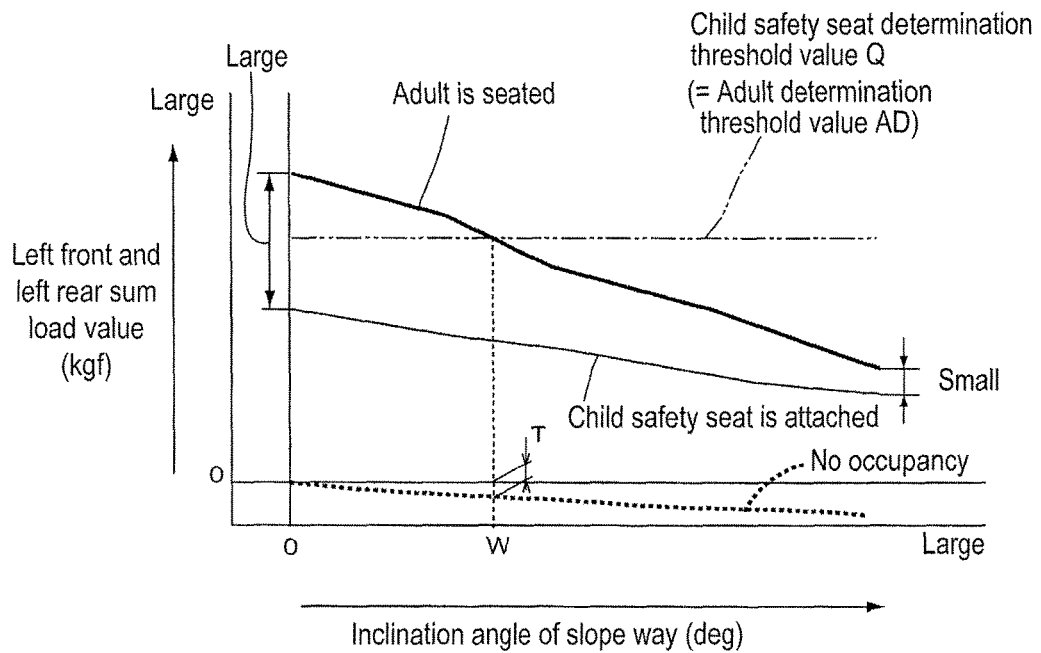
FIG. 4 is a diagram illustrating an example of experimental data on correlation between an inclination angle of the vehicle seat and characteristics of a left front and left rear sum load value, in a state where an adult is seated in the vehicle seat and the child safety seat is attached to the vehicle seat.

When the vehicle is stopped in the aforementioned state, the left front and left rear sum load value (fLF+fLR), which is the sum of the load applied by the vehicle seat 1 to the left front load sensor LF and the load applied by the vehicle seat 1 to the left rear load sensor LR, decreases according to an inclination angle of the slope way and fluctuates toward the negative side as illustrated in FIG. 4. In this embodiment, it is determined that the location where the vehicle is stopped is the slope way, that is, the vehicle is stopped while being inclined in a predetermined direction, by detecting the fluctuation of the left front and left rear sum load value (fLF+fLR), the fluctuation is generated when the vehicle is stopped under the aforementioned conditions. At this time, for acquiring more accurate determination result, it may be determined that the location where the vehicle stops is the slope way only after the left front and left rear sum load value (fLF+fLR) continues to fluctuate for more than a predetermined period of time.

As described above, after the no-occupancy determination portion 34a determines that no occupant is in the vehicle seat 1, the slope way determination portion 34b determines whether or not the vehicle is stopped on the slope way in an inclined state under the aforementioned predetermined conditions. More specifically, the slope way determination portion 34b determines that the vehicle is stopped on the slope way while being inclined in the predetermined direction in a case where a left front and left rear sum load value (fLF+fLR) em at empty condition fluctuates by a predetermined amount T (i.e., a first predetermined amount) illustrated in FIG. 5 or more relative to the left front and left rear sum load value (fLF+fLR=0). In this embodiment, the left front and left rear sum load value (fLF+fLR) em fluctuates toward the negative side. Here, the left front and left rear sum load value (fLF+fLR) em at empty condition refers to the left front and left rear sum load value (fLF+fLR) when the vehicle seat 1 is in the no-occupancy state. The left front and left rear sum load value (fLF+fLR=0) refers to the left front and left rear sum load value (fLF+fLR) that is reset to be zero (zero reset) on the vehicle in a horizontal state before shipment of the vehicle.

In this case, a magnitude of the predetermined amount T is decided according to an experiment conducted in advance. More specifically, according to this embodiment, the vehicle seat 1 (the vehicle) on which an adult is seated is brought to be inclined so that the right side of the vehicle seat 1 is positioned at a lower side of the inclination, that is, so that the left front and left rear load sensors LF, LR are positioned at the upper side of the inclination of the vehicle seat 1. As the vehicle seat 1 is brought to be inclined, the left front and left rear sum load value (fLF+fLR) gradually decreases (refer to FIG. 4). While maintaining this state, the inclination angle of the vehicle seat 1 (a limit inclination angle W) is obtained, at which the child safety seat determination threshold value Q (=the adult determination threshold value AD) determining or distinguishing an adult and a child safety seat from each other, and the left front and left rear sum load value (fLF+fLR) come to be equal to each other. The obtained limit inclination angle W refers to the inclination angle of the vehicle seat 1 at which the determination on the adult and the child safety seat is difficult.

Next, a fluctuation amount T of the left front and left rear sum load value (fLF+fLR), by which the left front and left rear sum load value (fLF+fLR) fluctuates toward the negative side, is obtained when the vehicle seat 1 that is in the no-occupancy state is brought to be inclined until the inclination angle of the vehicle seat 1 comes to be the limit inclination angle W (refer to FIG. 4). The obtained fluctuation amount T is defined as the predetermined amount T, by which the left front and left rear sum load value (fLF+fLR) fluctuates toward the negative side and which is used for determining that the vehicle is stopped on the slope way. Thus, in a case where the vehicle seat 1 in the no-occupancy state is inclined and the fluctuation amount of the left front and left rear sum load value (fLF+fLR) toward the negative side exceeds the predetermined amount T, it is recognized that the inclination angle of the vehicle exceeds the limit inclination angle W. Accordingly, the decision on the distinction between the adult and the child safety seat 5 is restricted from being made in order to prevent a wrong determination. The above-described method is one example for deciding the predetermined amount T. Therefore, a magnitude of the predetermined amount T for determining that the vehicle is stopped on the slope way may be decided in an arbitrary method.

After the determination is made by the slope way determination portion 34*b*, the seatbelt attachment determination portion 34*c* detects by means of the buckle switch 65 that the tongue plate 63 engages with the buckle 64, and thus that the on state is established. That is, it is detected that the occupant is seated in the vehicle seat 1 or the child safety seat 5 is attached to the vehicle seat 1.

After it is determined by the slope way determination portion 34*b* that the vehicle is stopped in the inclined state and it is determined by the seatbelt attachment determination portion 34*c* that the tongue plate 63 engages with the buckle 64, the tentative determination portion 34*d* tentatively determines that, for example, an adult is seated in the vehicle seat 1.

In a case where the vehicle stops at the inclined location such as the slope way in a manner that the front-rear direction of the vehicle and the inclination direction make the large angle, and that attachment positions of the left front and left rear load sensors LF, LR are positioned at the upper side of the inclination relative to the vehicle seat 1, the left front and left rear sum load value (fLF+fLR) fluctuates toward the negative side as described above. FIG. 4 is a diagram showing experiment results in which the left front and left rear sum load value (fLF+fLR) of the vehicle seat 1 in which the adult is seated or to which the child safety seat 5 is fastened decreases according to the inclination angle of the vehicle seat 1. When the adult is seated in the vehicle seat 1, the buttocks of the adult slide downwardlyalong the inclination of a seating surface, and thus the center of gravity of the adult seated in the vehicle seat 1 moves downwardly. As a result, the left front and left rear sum load value (fLF+fLR) fluctuates largely toward the negative side. On the other hand, in a case where the child safety seat 5 is fixed to the seat, the center of gravity of the child safety seat 5 does not move because the child safety seat 5 is not caused to slide or move by the inclination of the vehicle. Thus, the left front and left rear sum load value (fLF+fLR) fluctuates to decrease only slightly corresponding to an amount of the inclination of the vehicle.

Thus, when the vehicle is inclined, a difference between a left front and left rear sum load value (fLF+fLR) Ad when an adult is seated, which largely fluctuates toward the negative side, and a left front and left rear sum load value (fLF+fLR) Ch when the child safety seat is attached, which fluctuated slightly toward the negative side, is smaller than an actual difference therebetween. In addition, when the vehicle is inclined, each of the left front and left rear sum load value (fLF+fLR) Ad when the adult is seated and the left front and left rear sum load value (fLF+fLR) Ch when the child safety seat is attached is a value smaller than the child safety seat determination threshold value Q. Consequently, when the vehicle is inclined, it is difficult to distinguish between the left front and left rear sum load value (fLF+fLR) Ad when the adult is seated and the left front and left rear sum load value (fLF+fLR) Ch when the child safety seat is attached. Therefore, the tentative determination portion 34*d* does not make a decision on an occupancy determination but tentatively considers or assumes that an adult is seated in the vehicle seat 1 as a tentative determination result. However, a manner in which the tentative determination result is provided is not limited thereto and it may be tentatively determined that the child safety seat 5 is fastened to the vehicle seat 1 or no tentative determination result may be made so that the determination result is suspended. The manner in which the tentative determination result is provided may be arbitrarily decided.

The forward movement determination portion 34*e* determines that the vehicle moves forward. In this embodiment, the forward movement refers to the movement of the vehicle starting forward and running steadily on the flat ground. At this time, the forward moving (starting) may be detected in an arbitrary manner. In this embodiment, however, the forward movement is detected by monitoring the left front and left rear sum load value (fLF+fLR) and by detecting that the left front and left rear sum load value (fLF+fLR) increases by a predetermined amount P (i.e., a second predetermined amount) or more (refer to a portion f in FIG. 5). Once the vehicle starts moving forward and comes to be in a steady running state, the vehicle does not usually run on an inclined location on which the vehicle is inclined to either left side or right side, but runs on a flat ground. In a case where an adult is seated in the vehicle seat 1 or where the child safety seat 5 is fastened to the vehicle seat 1, when the vehicle runs on the flat ground, the left front and left rear sum load value (fLF+fLR) increases again and is restored, that is, returns to the left front and left rear sum load value (fLF+fLR) before the fluctuation occurs. Here, the forward movement determination portion 34*e* confirms whether the left front and left rear sum load value (fLF+fLR) is increased by the predetermined amount P or more. When the increment by the predetermined amount P or more is confirmed, the forward movement determination portion 34*e* determines that the vehicle is in a forward moving state that is suitable for the definite determination to be made. In this embodiment, the predetermined amount P is set on the basis of an amount of increase of the left front and left rear sum load value (fLF+fLR) Ch in a case where the child safety seat 5 is attached when the vehicle is moving forward because the amount of increase in the left front and left rear sum load value (fLF+fLR) Ch is smaller than an amount of increase in the left front and left rear sum load value (fLF+fLR) Ad when an adult is seated. Thus, the forward moving state is reliably detected even in a case where the child safety seat 5 is attached. The predetermined amount P may be arbitrarily set at an appropriate value by actually conducting an experiment. However, the predetermined amount P needs to be set so that the left front and left rear sum load value (fLF+fLR) exceeds the child safety seat determination threshold value Q (=the adult determination threshold value AD) in a case where the left front and left rear sum load value (fLF+fLR) increases by the predetermined amount P and thus it is determined that the vehicle is in the forward moving state.

In order to determine that the vehicle has moved forward, the determination may be made on the basis of a vehicle speed V of the vehicle instead of on the basis of the increment in the left front and left rear sum load value (fLF+fLR). A vehicle speed Va serving as a threshold is set at a speed at which it is difficult for the vehicle to run on the inclined location (for example, 10 to 20 kilometers per hour), so that the forward moving state (the steady running state) is appropriately detected. When the vehicle speed V is equal to or more than the predetermined vehicle speed Va, it is determined that the vehicle is moving forward. The vehicle speed V may be derived by detecting a rotation speed of a driving wheel by means of a rotation sensor provided in a vicinity of an axle of the vehicle. In this case, similar effects are obtained.

After it is determined by the forward movement determination portion 34e that the vehicle has moved forward, the definite determination portion 34f determines that an adult is seated in the vehicle seat 1 in a case where the left front and left rear sum load value (fLF+fLR) computed by the front and rear sum load value calculation portion 35 comes to be equal to or larger than the adult determination threshold value AD (=the child safety seat determination threshold value Q) set in advance. The definite determination portion 34f determines that the child safety seat 5 is fastened to the vehicle seat 1 in a case where the left front and left rear sum load value (fLF+fLR) is smaller than the child safety seat determination threshold value Q (the adult determination threshold value AD).

Next, functions of this embodiment will be explained with reference to FIG. 3, a diagram illustrated in FIG. 5, a flowchart illustrated in FIG. 6 and a transition diagram illustrated in FIG. 7. In the explanation of the functions, at an initial condition, an adult is seated in the passenger seat with the seatbelt device 6 fastened. After this, the explanation is made assuming that the vehicle is stopped at the slope way having a predetermined degree of incline (the degree of incline that is determined as the slope way according to this embodiment) in a manner that the front-rear direction of the vehicle is substantially orthogonal to the inclination of the slope way, that is, the vehicle is stopped sideways relative to the inclination. At this time, a vehicle seat at a driver side (the left side) is positioned at the upper side of the inclination relative to the vehicle seat 1 at the passenger seat side (at the right side), and the left front and left rear load sensors LF, LR which are arranged at an inner side of the vehicle seat 1 of the passenger side (that is, a middle side of the vehicle) are positioned at the upper side of the inclination relative to the vehicle seat 1 of the passenger side.

Figure 6:
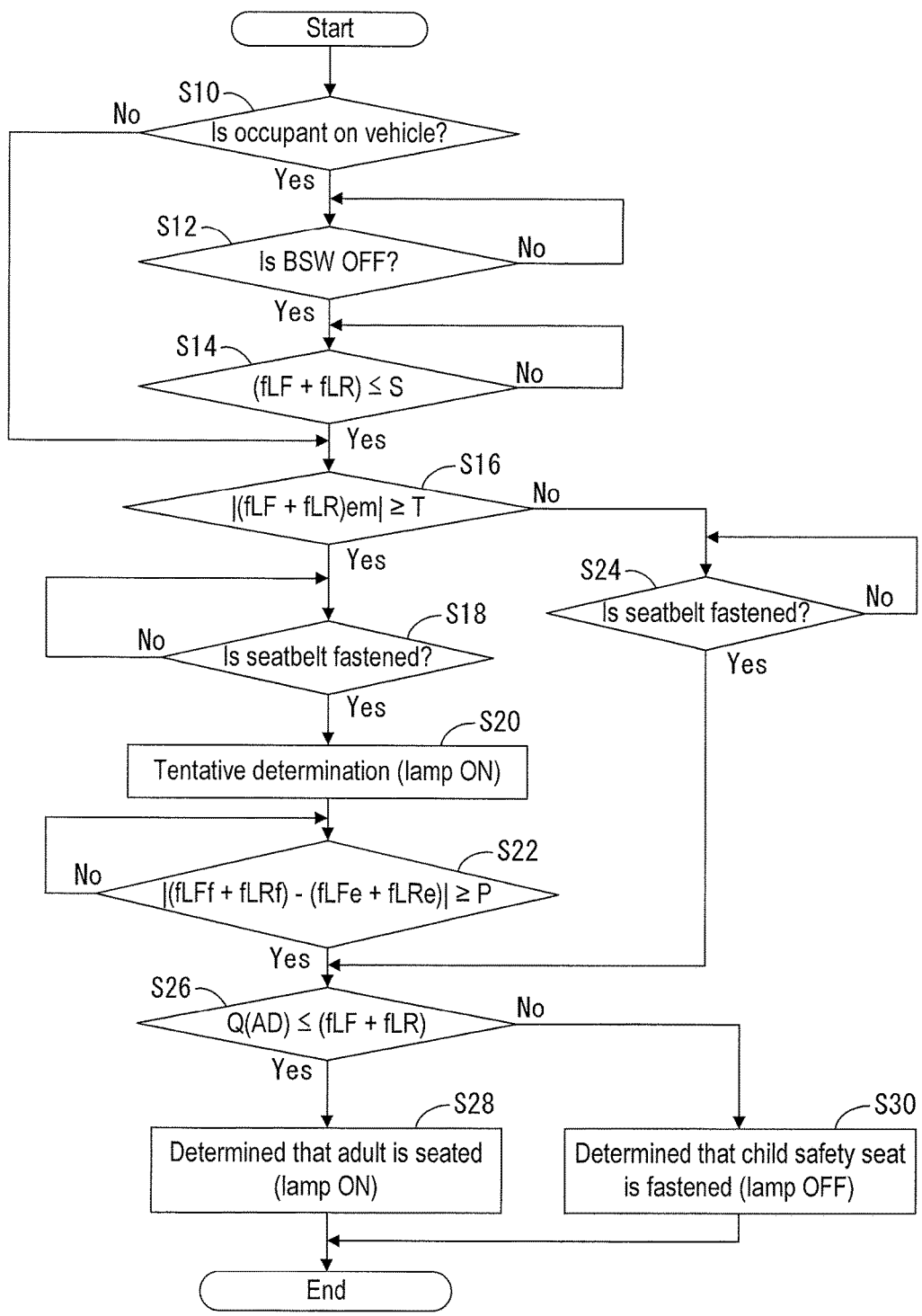
FIG. 6 is a flowchart for determining seating of the adult and attachment of the child safety seat according to the embodiment.

As illustrated in the flowchart of FIG. 6, at a step S10, it is confirmed whether it was determined by the seat occupancy determination apparatus that an adult was seated in the vehicle seat (an adult seated state) or the child safety seat 5 was fastened to the vehicle seat (a child safety seat attached state), or it was determined that the vehicle seat 1 was in the no-occupancy state before the vehicle stopped. In a case where the vehicle seat 1 was in the adult seated state or in the child safety seat attached state, the flow moves to a step S12 (the no-occupancy determination portion 34a). When the vehicle seat 1 is in the no-occupancy state, the flow proceeds to a step S18. Hereinafter, the explanation will be made for a case where the adult is seated in the vehicle seat 1 and most of the explanation for a case where the child safety seat 5 is fastened to the vehicle seat 1 will be omitted. In a case where the child safety seat 5 is fastened to the vehicle seat 1, "adult" will be replaced with and read as "child safety seat 5" appropriately.

At the step S12 (the no-occupancy determination portion 34a), it is confirmed whether or not the adult seated in the passenger seat (that is, the vehicle seat 1) has turned off the buckle switch 65 by disengaging the tongue plate 63 from the buckle 64 in order to get off the vehicle (refer to a portion a in FIG. 5). In a case where the buckle switch 65 is turned off, the flow proceeds to a step S14 (the no-occupancy determination portion 34a).

In a case where the occupant (the adult) does not get off the vehicle, and therefore the seatbelt 66 remains fastened, the step S12 is repeated until the buckle switch 65 comes to be turned off. At this time, in the transition diagram of FIG. 7, "the adult seated state (J2)" is maintained, an indicator lamp provided inside the vehicle cabin remains ON (light on) and the airbag is controlled to be in a deployable state. In a case where the child safety seat 5 is fastened to the vehicle seat 1, in the transition diagram of FIG. 7, "the child safety seat attached state (J3)" is maintained, the indicator lamp provided inside the vehicle cabin remains OFF (light off) and the airbag is controlled to be in a non-deployable state.

Next, at the step S14 (the no-occupancy determination portion 34a), it is confirmed whether or not the left front and left rear sum load value (fLF+fLR), which has decreased as the occupant (the adult) gets off the vehicle, is equal to or smaller than no-occupancy determination threshold S (zero kilograms) (refer to a portion b in FIG. 5). When the left front and left rear sum load value (fLF+fLR) is equal to or smaller than the no-occupancy determination threshold S, it is determined that the occupant (the adult) has left the vehicle seat 1 (the passenger side seat) and thus the vehicle seat 1 is in the no-occupancy state, and the flow proceeds to a step S16 (the slope way determination portion 34b). At this time, in the transition diagram of FIG. 7, the state of the vehicle seat 1 moves from "the adult seated state (J2)" to "a no-occupancy state (J1)". However, when the left front and left rear sum load value (fLF+fLR) does not fluctuate or when the left front and left rear sum load value (fLF+fLR) fluctuates but is larger than the no-occupancy determination threshold S, the step S14 is repeated until the left front and left rear sum load value (fLF+fLR) comes to be equal to or smaller than the no-occupancy determination threshold S.

Next, in the step S16 (the slope way determination portion 34b), it is determined whether the location at which the vehicle is stopped is the slope way or the flat ground. The slope way determination portion 34b determines whether or not the left front and left rear sum load value (fLF+fLR) em at empty condition (refer to a portion c in FIG. 5) when the vehicle seat 1 is in the no-occupancy state fluctuates by the predetermined amount T (i.e., the first predetermined amount) or more relative to the left front and left rear sum load value (fLF+fLR=0) in the no-occupancy state which is reset to be zero on the vehicle in the horizontal state before shipment of the vehicle (refer to a portion d in FIG. 5). In this embodiment, the left front and left rear sum load value (fLF+fLR) em fluctuates toward the negative side. In the Step S16, it is determined whether |(fLF+fLR)em−0|≥T. However, in this embodiment, the left front and left rear sum load value in the no-occupancy state, which is used as a standard value for detecting the fluctuation, is set to be zero, and therefore |(fLF+fLR)em|≥T appears in the Step S16 of the flowchart of FIG. 5. In some cases, the left front and left rear sum load value (fLF+fLR) em at empty condition that is used for the determination in the step S16 may be the same value as the left front and left rear sum load value (fLF+fLR) which has decreased upon getting-off of the occupant (the adult) from the vehicle and which is used for the determination in step S14. However, for a purpose of a clear differentiation from the left front and left rear sum load value (fLF+fLR) including a possibility that an occupant is seated in the vehicle seat 1, the left front and left rear sum load value (fLF+fLR) after the getting-off of the occupant from the vehicle was determined is referred to as the left front and left rear sum load value (fLF+fLR) em at empty condition in the step S16. That is, in order to differentiate the left front and left rear sum load value (fLF+fLR) after the getting-off of the occupant from the vehicle is confirmed (that is, in a state where no occupant is seated), and the left front and left rear sum load value (fLF+fLR) in a state where the getting-off of the occupant from the vehicle is not confirmed, the left front and left rear sum load value (fLF+fLR) in the step S16 is referred to as the left front and left rear sum load value (fLF+fLR) em at empty condition.

In this embodiment, the vehicle is stopped on the slope way having the predetermined degree of incline in a manner that the front-rear direction of the vehicle is substantially orthogonal to the inclination of the slope way, that is, the vehicle is stopped sideways relative to the inclination. Further, the left front and left rear load sensors LF, LR which are arranged at the inner side of the vehicle seat 1 (that is, the middle side of the vehicle) are positioned at the upper side of the inclination relative to the vehicle seat 1 at the passenger side. Accordingly, the left front and left rear sum load value (fLF+fLR) em at empty condition fluctuates toward the negative side and the fluctuation amount exceeds the predetermined amount T (i.e., the first predetermined amount), and therefore it is determined that the location where the vehicle is stopped is the slope way. Then, the flow proceeds to the step S18.

However, in a case where the fluctuation amount in the left front and left rear sum load value (fLF+fLR) em at empty condition does not exceed the predetermined amount T (i.e., the first predetermined amount), and therefore it is determined that the location where the vehicle is stopped is the flat ground (the flat ground includes a gentle slope having an inclination that is not determined as a slope way), the flow proceeds to a step S24 (the seatbelt attachment determination portion 34c).

In the step S24 (the seatbelt attachment determination portion 34c), it is determined whether or not the tongue plate 63 engages with the buckle 64, that is, whether or not an occupant is seated on the vehicle seat 1 with the seatbelt device 6 fastened (or the child safety seat 5 is attached, that is, fastened). In a case where the tongue plate 63 engages with the buckle 64 (the seatbelt device 6 is fastened), the flow proceeds to a step S26 so that it is distinguished by the definite determination portion 34f between the adult seated in the vehicle seat 1 and the child safety seat 5 fastened to the vehicle seat 1. In a case where the seatbelt 66 is not fastened, the step S24 is repeated until the seatbelt 66 comes to be fastened.

In the similar manner to the step S24, the step S18 (the seatbelt attachment determination portion 34c) is repeated until the tongue plate 63 engages with the buckle 64, that is, until it is confirmed that the occupant is seated in the vehicle seat 1 (or the child safety seat 5 is attached (fastened) to the vehicle seat 1). In a case where the tongue plate 63 engages with the buckle 64 as illustrated at a portion e in FIG. 5, the flow proceeds to a step S20 (the tentative determination portion 34d).

In the step S20 (the tentative determination portion 34d), it is tentatively determined that the vehicle seat 1 is in "the adult seated state (J2)". In the transition diagram of FIG. 7, the state of the vehicle seat 1 moves from "the no-occupancy (J1)" to "the adult seated state (J2)", the airbag is allowed to be deployable and the indicator lamp is ON (light on) to indicate that operation of the airbag is allowed. However, the determination made at this time is the tentative determination, and therefore, instead of determining that the adult is seated in the vehicle seat 1, it may be tentatively determined that the child safety seat 5 is fastened to the vehicle seat 1 so that the indicator lamp is lit off or no tentative determination may be made so that the determination result is suspended.

In a step S22 (the forward movement determination portion 34e), it is determined that, for example, the vehicle stopped on a road with a front portion of the vehicle facing a roadside moves backward once, the steering wheel of the vehicle is operated to be turned backwards, and the vehicle moves forward (starts to move) and has come be in the steady running state (refer to the portion f in FIG. 5) by confirming the increment in the left front and left rear sum load value (fLF+fLR) by the predetermined amount P (i.e., the second predetermined amount) or more. In the step S22, it is checked whether or not a difference in the left front and left rear sum load value (fLF+fLR) before and after the vehicle starts moving is equal to or larger than the predetermined amount P. Thus, the left front and left rear sum load value (fLF+fLR) before the vehicle starts moving after the buckle switch 65 is turned on is referred to as a left front and left rear sum load value (fLFe+fLRe) (the portion e in FIG. 5), and the left front and left rear sum load value (fLF+fLR) used for confirming whether the increment is equal to or larger than the predetermined amount P is referred to as a left front and left rear sum load value (fLFf+fLRf) (the portion f in FIG. 5). In a case where the increment of the left front and left rear sum load value (fLF+fLR) is below the predetermined amount P (i.e., the second predetermined amount) and thus the forward movement of the vehicle is not confirmed, the step S22 is repeated until the forward movement (the start) of the vehicle is confirmed. In a case where the increment of the left front and left rear sum load value (fLF+fLR) is equal to or larger than the predetermined amount P (i.e., the second predetermined amount) and thus the forward movement (the start) of the vehicle is confirmed, the flow proceeds to the step S26 (the definite determination portion 34f).

As illustrated in FIG. 5 (a portion g), in a case where the left front and left rear sum load value (fLF+fLR) calculated by the front and rear sum load value calculation portion 35 is equal to or larger than the adult determination threshold value AD (=the child safety seat determination threshold value Q) in the step S26, it is determined that the adult is seated in the vehicle seat 1 in the step S28 and "the adult seated state (J2)" is maintained. At this time, in a case where the immediately preceding step was the step S24, the state of the vehicle seat 1 moves from "the no-occupancy (J1)" to "the adult seated state (J2)", the airbag is allowed to be deployable and the indicator lamp is ON (light on) in the transition diagram of FIG. 7.

Figure 7:
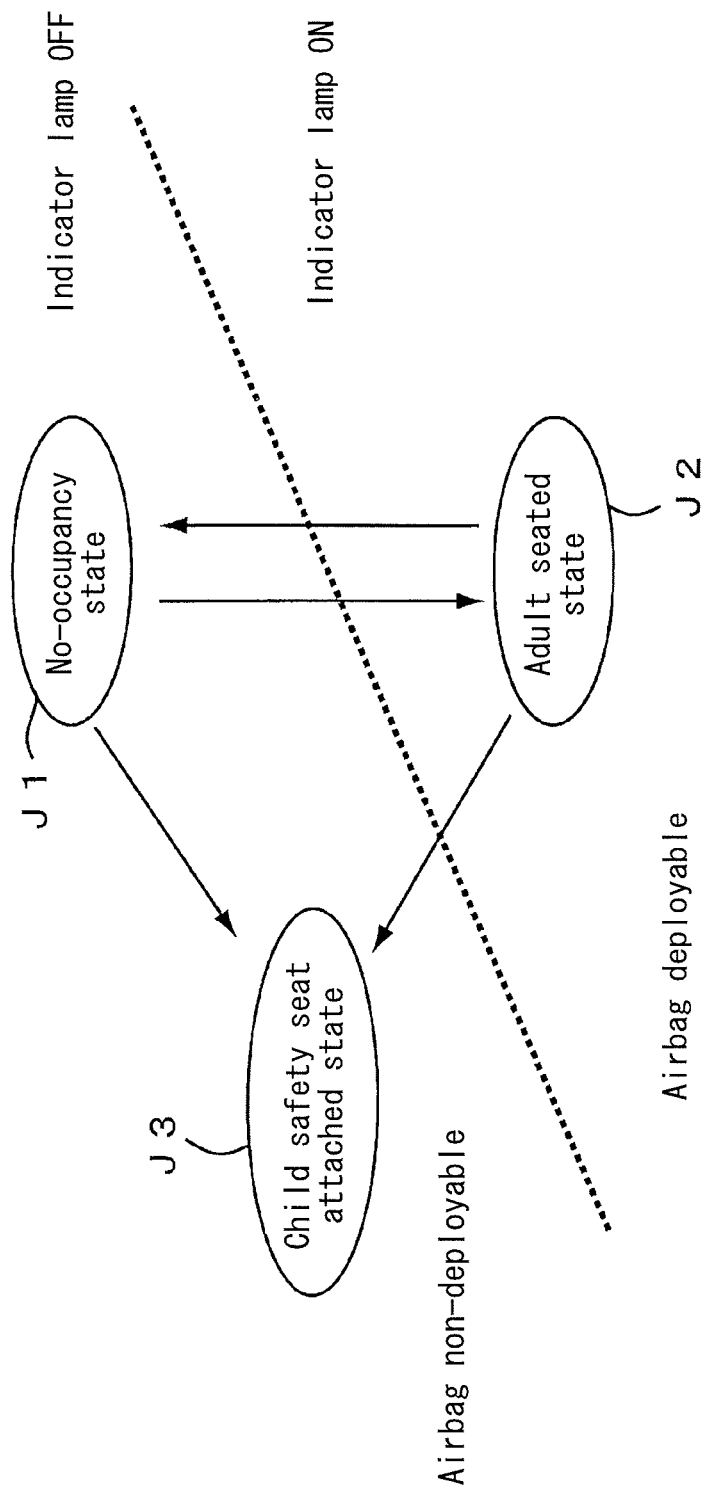
FIG. 7 is a transition diagram illustrating states for controlling deployment of an airbag according to the embodiment.

In a case where the left front and left rear sum load value (fLF+fLR) is smaller than the child safety seat determination threshold value Q in the step S26, it is determined that the child safety seat 5 is attached (fastened) to the vehicle seat 1 in a step S30, and the state of the vehicle seat 1 moves from "the no-occupancy (J1)" to "the child safety seat attached state (J3)", the airbag is non-deployable and the indicator lamp is turned OFF (light off) in the transition diagram of FIG. 7.

In this disclosure, the first load detection device and the second load detection device are provided as the pair in the front-rear direction at one of the left and right sides of the vehicle seat 1. That is, a right front load sensor RF (i.e., the first load detection device) and a right rear load sensor RR (i.e., the second load detection device) may be provided as a pair in the front-rear direction at the right side of the vehicle seat 1 (that is, a vehicle door side) (refer to FIG. 1). In this case, the vehicle is stopped on the slope way in a manner a vehicle seat at the driver side is positioned at the lower side of the inclination relative to the vehicle seat 1 at the passenger side. When the vehicle is stopped in a manner that the right front load sensor RF and the right rear load sensor RR, both of which are arranged at an outer side of the vehicle seat 1 (the door side of the vehicle) are positioned at the upper side of the inclination relative to the vehicle seat 1 at the passenger side, a slope way stopped state (that is, the state where the vehicle is stopped on the slope way) of this disclosure is established. In this case, similar effects are obtained to the above-described case of the first embodiment.

As is clear from the above explanation, according to the seat occupancy determination apparatus 10 of the first embodiment, the left front load sensor LF or the right front load sensor RF (i.e., the first load detection device) and the left rear load sensor LR or the right rear load sensor RR (i.e., the second load detection device) are provided at the inner side of the vehicle seat 1 (that is, the middle side of the vehicle) or at the outer side of the vehicle seat 1 (that is, the vehicle door side) in the front-rear direction. In a case where the left front load sensor LF and the left rear load sensor LR, or the right front load sensor RF and the right rear load sensor RR are arranged at the vehicle seat 1 in the above-described manner, and the vehicle is stopped on the slope way in the inclined state so that the left front load sensor LF and the left rear load sensor LR, or the right front load sensor RF and the right rear load sensor RR are positioned at the upper side of the incline relative to the vehicle seat 1, each of the load values of the vehicle seat 1 which are applied to the respective load sensors fluctuates toward the negative side relative to each of the load values of the vehicle seat 1 which are applied to the respective load sensors when the vehicle is in the horizontal state. Thus, in this embodiment, it is determined that the vehicle is stopped on the slope way in the inclined state by detecting that each of the load values of the vehicle seat 1 which are applied to the left front load sensor LF and the left rear load sensor LR, or the right front load sensor RF and the right rear load sensor RR has fluctuated toward the negative side. Once it is determined that the vehicle is stopped in the inclined state, the decision on the distinction between the adult and the child safety seat 5 is suspended and it is tentatively determined that the vehicle seat 1 is in "the adult seated state (J2)", that is, it is tentatively determined that the adult is seated in the vehicle seat 1. At this time, in the transition diagram of FIG. 7, the state of the vehicle seat 1 moves from "the no-occupancy (J1)" to "the adult seated state (J2)" and the airbag is allowed to be deployable.

After the vehicle moves forward (starts) and comes to be in the steady running state on the flat ground, and when the vehicle seat 1 is in a state where the load of the adult or the child safety seat 5 in the vehicle seat 1 is sufficiently applied to the left front load sensor LF and the left rear load sensor LR, or to the right front load sensor RF and the right rear load sensor RR, the decision on the distinction between the adult and the child safety seat 5 is performed by using the adult determination threshold value AD and the child safety seat determination threshold value Q, and this decision is defined as the definite determination. Thus, even in a case where the vehicle is stopped in a manner that the front-rear direction of the vehicle is substantially sideways relative to the inclination of the slope, the slope way determination is appropriately made, and thus it is accurately determined that the child safety seat 5 is fastened to the vehicle seat 1 without erroneous determination.

Next, a seat occupancy determination apparatus 80 of a second embodiment will be explained with reference to FIG. 1. According to the seat occupancy determination apparatus 80 of the second embodiment, a front left load sensor FL (i.e., the first load detection device) and a front right load sensor FR (i.e., the second load detection device) are arranged under the vehicle seat 1 at a front side so as to be spaced away from each other by a predetermined distance in the left-right direction. That is, the front left load sensor FL is arranged at the support portion between the seat frame 111 of the vehicle seat 1 and a front portion of the upper rail 14L, and the front right load sensor FR is arranged at the support portion between the seat frame 111 and a front portion of the upper rail 14R in a manner that the predetermined distance is provided in the left-right direction between the front left load sensor FL and the front right load sensor FR. Other structures and configurations in the second embodiment are identical to those in the first embodiment, therefore the explanations on the identical structures and configurations will be omitted.

At the time of shipment of the vehicle, each of a front left load value fFL and a front right load value fFR is reset to be zero (zero reset) in the state where the vehicle is placed in the horizontal state. The front left load sensor FL and the front right load sensor FR detect the load which is generated, for example, when an occupant is seated in the vehicle seat 1 or when baggage is placed on the vehicle seat 1, and is applied downwardly to the seat cushion 11.

The front left load sensor FL detects the front left load value fFL (i.e., the first load value) that is borne by the front left portion of the vehicle seat 1. In a similar manner thereto, the front right load sensor FR detects the front right load value fFR (i.e., the second load value) that is borne by a front right portion of the vehicle seat 1.

As the front left load sensor FL and the front right load sensor FR are provided under the vehicle seat 1 in the above-described arrangement, in a case where the vehicle is stopped in a manner that the front-rear direction of the vehicle is substantially parallel to the inclination direction of the slope way and that a front portion of the vehicle is positioned at the upper side of the inclination relative to a rear portion of the vehicle, the sum load value (a front left and front right sum load value (fFL+fFR)) (i.e., the sum load value) which is given by the vehicle seat 1 to the front left load sensor FL and the front right load sensor FR acts so as to be decreased and fluctuates. In this embodiment, the fluctuation occurs toward the negative side.

Accordingly, in the explanations made about the seat occupancy determination apparatus 10 of the first embodiment and about the flowchart in FIG. 6, the left front load sensor LF and the left rear load sensor LR will be replaced with and read as the front left load sensor FL and the front right load sensor FR, respectively, and the left front and left rear sum load value (fLF+fLR) will be replaced with and read as the front left and front right sum load value (fFL+fFR). The left front load value fLF and the left rear load value fLR will be replaced with and read as the front left load value fFL and front right load value fFR, respectively. Thus, the explanation made in the first embodiment will be applied to the seat occupancy determination apparatus 80 of the second embodiment. By performing the identical processes to those illustrated in the flowchart according to the first embodiment, similar effects to those of the first embodiment are obtained.

A rear left load sensor RL (i.e., the first load detection device) and a rear right load sensor RrR (i.e., the second load detection device) may be provided at a rear side of the vehicle seat 1 as a pair in the left-right direction (refer to FIG. 1). In this case, the vehicle is stopped in a manner that the front-rear direction of the vehicle is substantially parallel to the inclination direction of the slope way and that the front portion of the vehicle is positioned at the lower side of the inclination relative to the rear portion of the vehicle, a rear left and rear right sum load value (fRL+fRrR) (i.e., the sum load value) which is given by the vehicle seat 1 to the rear left load sensor RL and the rear right load sensor RrR decreases, and fluctuates toward the negative side. By performing the identical processes to those illustrated in the flowchart according to the first embodiment, the similar effects to the seat occupancy determination apparatus 10, 80 of the first and second embodiments are obtained. In this case, each of the load sensors, the load values, the sum load values and the like illustrated in the flowchart of FIG. 6 will be replaced and read appropriately so that these sensors and values in the flowchart correspond to the rear left load sensor RL and the rear right load sensor RrR.

Figure 8:
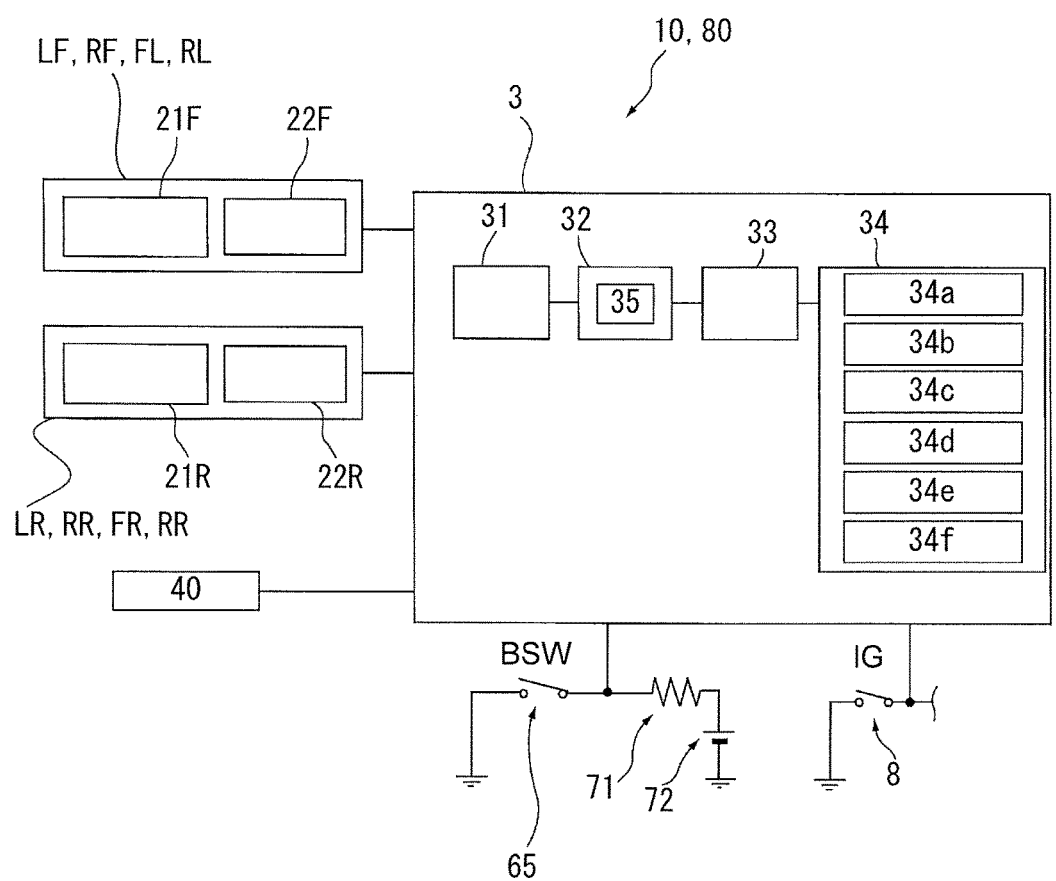
FIG. 8 is a block diagram schematically illustrating the seat occupancy determination apparatus.

According to the seat occupancy determination apparatus 10, 80 of the first and second embodiments, the slope way determination portion 34b determines that the vehicle is stopped on the slope way in the inclined state in a case where the left front and left rear sum load value (fLF+fLR) em at empty condition or the front left and front right sum load value (fFL+fFR) em at empty condition fluctuates by the predetermined amount T or more toward the negative side after the no-occupancy determination portion 34a determines the getting-off of the occupant from the vehicle. However, the method of determining that the vehicle is stopped on the slope way is not limited thereto. For example, an inclination angle sensor disclosed in JP2002-318113A, which is configured to detect the inclination of a vehicle, may be provided so that it is determined that the vehicle is stopped on the slope way on the basis of a detection value of the inclination angle sensor. Accordingly, more accurate determination results are obtained. Further, a program used to make the determinations is simplified. As illustrated in FIG. 8, the seat occupancy determination apparatus 10, 80 may be provided with an inclination angle sensor 40 configured to detect the inclination of the vehicle and to transmit, from an outside the controller 3, the detection results to the controller 3. In FIG. 8, with regard to the parts and portions to which numerical designations identical to those in FIG. 2 are given, the above-explained explanation made to FIG. 2 will apply. Further, in a case where the vehicle is stopped on an inclination on which the left front and left rear sum load value (fLF+fLR), a right front and right rear sum load value (fRF+fRR) (i.e., the sum load value), the front left and front right sum load value (fFL+fFR) or a rear left and rear right sum load value (fRL+fRrR) (i.e., the sum load value) increases, instead of decreasing, the determination is easily made on whether the increment of the sum load value is caused by the baggage placed on the vehicle seat 1 or by the inclination of the vehicle, and therefore the structure including the inclination angle sensor 40 may be applied to the embodiments disclosed here.

Further, according to the seat occupancy determination apparatus 10, 80 of the first and second embodiments, the no-occupancy determination portion 34a determines that the occupant has gotten off, that is, has left the passenger seat in a case where an OFF signal of the buckle switch 65 serving as the seatbelt attachment detection device is transmitted and the sum load value after the occupant gets off the vehicle is equal to or smaller than the no-occupancy determination threshold S. However, the no-occupancy determination portion 34a may determine that the occupant has gotten off the vehicle on the basis of an opening/closing operation of a door that is positioned at the outer side relative to the vehicle seat 1 and on the basis of the sum load value that comes to be equal to or smaller than the no-occupancy determination threshold S after the getting-off of the occupant from the vehicle. Alternatively, the no-occupancy determination portion 34a may determine that the occupant has gotten off the vehicle on the basis of a period of time for which the sum load value, which comes to be equal to or smaller than the no-occupancy determination threshold S after the occupant gets off the vehicle, is maintained. By applying the above-described manners in the embodiments, the determination on the getting-off of the occupant from the vehicle is made even in a case where the occupant is seated in the passenger seat without fastening the seatbelt device 6.

According to the aforementioned embodiments, the seat occupancy determination apparatus 10, 80 includes the buckle switch 65 detecting the engagement and the disengagement of the tongue plate 63 of the seatbelt 66 and the buckle 64 of the seatbelt 66 relative to each other, the left front load sensor LF and the left rear load sensor LR, the right front load sensor RF and the right rear load sensor RR, the front left load sensor FL and the front right load sensor FR, or the rear left load sensor RL and the rear right load sensor RrR which are arranged under the vehicle seat 1 at the two of the support portions each supporting the vehicle seat 1 in a manner that the left front load sensor LF and the left rear load sensor LR, the right front load sensor RF and the right rear load sensor RR, the front left load sensor FL and the front right load sensor FR, or the rear left load sensor RL and the rear right load sensor RrR are spaced away from each other, each of the left front load sensor LF and the left rear load sensor LR, each of the right front load sensor RF and the right rear load sensor RR, each of the front left load sensor FL and the front right load sensor FR, or each of the rear left load sensor RL and the rear right load sensor RrR detects the part of the load acting on the vehicle seat. Further, the seat occupancy determination apparatus 10, 80 includes the controller 3 obtaining the left front load value fLF, a right front load value fRF, the front left load value fFL or a rear left load value fRL (i.e., the first load value) which is detected at the left front load sensor LF, the right front load sensor RF, the front left load sensor FL or the rear left load sensor RL respectively, and the left rear load value fLR, a right rear load value fRR, the front right load value fFR or a rear right load value fRrR (i.e., the second load value) which is detected at the left rear load sensor LR, the right rear load sensor RR, the front right load sensor FR or the rear right load sensor RrR respectively, and performing the calculation. The controller 3 includes the front and rear sum load value calculation portion 35 computing the left front and left rear sum load value (fLF+fLR), the right front and right rear sum load value (fRF+fRR), the front left and front right sum load value (fFL+fFR) or the rear left and rear right sum load value (fRL+fRrR) (i.e., the sum load value) computed by adding the left front load value fLF and the left rear load value fLR to each other, the right front load value fRF and the right rear load value fRR to each other, the front left load value fFL and the front right load value fFR to each other, or the rear left load value fRL and the rear right load value fRrR to each other, the no-occupancy determination portion 34a determining that the vehicle seat 1 is in the no-occupancy state (J1) when the tongue plate 63 is disengaged from the buckle 64 and the left front and left rear sum load value (fLF+fLR), the right front and right rear sum load value (fRF+fRR), the front left and front right sum load value (fFL+fFR) or the rear left and rear right sum load value (fRL+fRrR) is equal to or smaller than the no-occupancy determination threshold S, the slope way determination portion 34b determining that the vehicle is stopped on the slope way while being inclined in a manner that the attachment position of each of the left front load sensor LF and the left rear load sensor LR, the right front load sensor RF and the right rear load sensor RR, the front left load sensor FL and the front right load sensor FR, or the rear left load sensor RL and the rear right load sensor RrR is positioned at the upper side of the inclination relative to the vehicle seat 1 in a case where it is determined by the no-occupancy determination portion 34a that the vehicle seat 1 is in the no-occupancy state (J1), the seatbelt attachment determination portion 34c determining that the seatbelt 66 is fastened when it is detected by the buckle switch 65 that the tongue plate 63 engages with the buckle 64 after the determination is made by the slope way determination portion 34b, the tentative determination portion 34d tentatively making the seat occupancy determination after it is determined by the slope way determination portion 34b that the vehicle is stopped on the slope way while being inclined and it is determined by the seatbelt attachment determination portion 34c that the tongue plate 63 engages with the buckle 64, the forward movement determination portion 34e determining that the vehicle starts moving forward and runs steadily on the flat ground, the definite determination portion 34f determining that the adult is seated in the vehicle seat 1 when the left front and left rear sum load value (fLF+fLR), the right front and right rear sum load value (fRF+fRR), the front left and front right sum load value (fFL+fFR) or the rear left and rear right sum load value (fRL+fRrR) computed by the front and rear sum load value calculation portion 35 is equal to or larger than the adult determination threshold value AD that is set in advance and determining that the child safety seat 5 is fastened to the vehicle seat 1 when the left front and left rear sum load value (fLF+fLR), the right front and right rear sum load value (fRF+fRR), the front left and front right sum load value (fFL+fFR) or the rear left and rear right sum load value (fRL+fRrR) is smaller than the child safety seat determination threshold value Q that is set in advance, the definite determination portion 34f making the determination after it is determined by the forward movement determination portion 34e that the vehicle starts moving forward and runs steadily on the flat ground.

According to the above-described configuration, the left front load sensor LF and the left rear load sensor LR, the right front load sensor RF and the right rear load sensor RR, the front left load sensor FL and the front right load sensor FR, or the rear left load sensor RL and the rear right load sensor RrR are arranged at the two of the support portions each supporting the vehicle seat 1 in a manner that the left front load sensor LF and the left rear load sensor LR, the right front load sensor RF and the right rear load sensor RR, the front left load sensor FL and the front right load sensor FR, or the rear left load sensor RL and the rear right load sensor RrR are spaced away from each other. Thus, in a case where the vehicle is stopped on the slope way in the inclined state and the left front load sensor LF and the left rear load sensor LR, the right front load sensor RF and the right rear load sensor RR, the front left load sensor FL and the front right load sensor FR, or the rear left load sensor RL and the rear right load sensor RrR are positioned at the upper side of the incline relative to the vehicle seat 1, the left front and left rear sum load value (fLF+fLR), the right front and right rear sum load value (fRF+fRR), the front left and front right sum load value (fFL+fFR) or the rear left and rear right sum load value (fRL+fRrR) (i.e., the sum load value) of the vehicle seat 1 in the no-occupancy state (J1) fluctuates relative to the left front and left rear sum load value (fLF+fLR), the right front and right rear sum load value (fRF+fRR), the front left and front right sum load value (fFL+fFR) or the rear left and rear right sum load value (fRL+fRrR) of the vehicle seat 1 in the no-occupancy state (J1) when the vehicle is stopped in the horizontal state. Thus, in the embodiments, it is determined that the vehicle is stopped on the slope way by detecting that the left front and left rear sum load value (fLF+fLR), the right front and right rear sum load value (fRF+fRR), the front left and front right sum load value (fFL+fFR) or the rear left and rear right sum load value (fRL+fRrR) of the vehicle seat 1 fluctuates. In a case where it is determined that the vehicle is stopped on the slope way, the final decision on the distinction between the adult seated in the vehicle seat 1 and the child safety seat 5 fastened to the vehicle seat 1 is suspended and the tentative determination is made because the accurate occupancy determination may not be made as described above. After that, in a case where the stopped vehicle starts moving to come out of the inclined state and moves forward so that the left front and left rear sum load value (fLF+fLR), the right front and right rear sum load value (fRF+fRR), the front left and front right sum load value (fFL+fFR) or the rear left and rear right sum load value (fRL+fRrR) of the vehicle seat 1 in which the adult is seated or to which the child safety seat 5 is fastened is sufficiently applied to the left front load sensor LF and the left rear load sensor LR, the right front load sensor RF and the right rear load sensor RR, the front left load sensor FL and the front right load sensor FR, or the rear left load sensor RL and the rear right load sensor RrR, that is, after the vehicle moves to the flat ground running state (that is, the state where the vehicle runs on the flat ground), the distinction between the adult and the child safety seat 5 is made by the definite determination portion 34f. As described above, when the vehicle is stopped on the slope way, the definite determination between the adult and the child safety seat 5 is restricted in the slope way stopped state. The definite determination is made after the vehicle starts moving forward and runs steadily on the flat ground, and therefore the adult and the child safety seat 5 is accurately distinguished from each other without erroneous determination.

According to the first embodiment, the left front load sensor LF and the left rear load sensor LR, or the right front load sensor RF and the right rear load sensor RR are arranged under the vehicle seat 1 at one of the left and right sides in a manner that the left front load sensor LF and the left rear load sensor LR, or the right front load sensor RF and the right rear load sensor RR are spaced away from each other in the front-rear direction of the vehicle.

According to the above-described configuration, the left front load sensor LF and the left rear load sensor LR, or the right front load sensor RF and the right rear load sensor RR are provided at the inner side of the vehicle seat 1 (that is, the middle side of the vehicle) or at the outer side of the vehicle seat 1 (that is, the vehicle door side) in the front-rear direction in a manner that the left front load sensor LF and the left rear load sensor LR are spaced away from each other in the front-rear direction, or the right front load sensor RF and the right rear load sensor RR are spaced away from each other in the front-rear direction. Thus, when the front-rear direction of the vehicle and the inclination direction of the slope way make the large angle therebetween, that is, in a case where the vehicle is stopped in a manner that the front-rear direction of the vehicle is substantially orthogonal to the inclination of the slope way, the determination of the slope way is appropriately made.

According to the aforementioned embodiments, the slope way determination portion 34b determines that the vehicle is stopped on the slope way while being inclined in a case where the left front and left rear sum load value (fLF+fLR), the right front and right rear sum load value (fRF+fRR), the front left and front right sum load value (fFL+fFR) or the rear left and rear right sum load value (fRL+fRrR) (i.e., the sum load value) of the vehicle seat 1 in the no-occupancy state (J1) fluctuates by the predetermined amount T or more relative to the left front and left rear sum load value (fLF+fLR), the right front and right rear sum load value (fRF+fRR), the front left and front right sum load value (fFL+fFR) or the rear left and rear right sum load value (fRL+fRrR) of the vehicle seat 1 in the no-occupancy state (J1) when the vehicle is in the horizontal state.

Consequently, by applying this determination method, the determination of the slope way is made accurately by means of the only two load sensors, and thus cost reduction may be achieved.

According to the aforementioned embodiments, the seat occupancy determination apparatus 10, 80 further includes the inclination angle sensor 40 configured to detect the inclination of the vehicle, wherein it is detected at the slope way determination portion 34b that the vehicle is stopped on the slope way while being inclined on the basis of the detection value of the inclination angle sensor 40.

Consequently, the accurate determination results are obtained and, further, the program used to make the determinations is simplified.

According to the aforementioned embodiments, the forward movement determination portion 34e determines that the vehicle starts moving forward and runs steadily on the flat ground in a case where the left front and left rear sum load value (fLF+fLR), the right front and right rear sum load value (fRF+fRR), the front left and front right sum load value (fFL+fFR) or the rear left and rear right sum load value (fRL+fRrR) computed when it is determined by the seatbelt attachment determination portion 34c that the seatbelt 66 is fastened increases by the predetermined amount P or more.

According to the above-described configuration, the forward movement determination portion 34e determines that the vehicle has moved forward, that is, the vehicle has moved from the slope way stopped state to be in the flat ground running state and started the steady running in a case where the left front and left rear sum load value (fLF+fLR), the right front and right rear sum load value (fRF+fRR), the front left and front right sum load value (fFL+fFR) or the rear left and rear right sum load value (fRL+fRrR) of the vehicle seat 1, in which the adult is seated or to which the child safety seat 5 is fastened, increases by the predetermined amount P or more when the vehicle is stopped on the slope way. In other words, the definite determination is performed at the definite determination portion 34f after it is confirmed that the vehicle moved to be in the flat ground running state, and that the left front and left rear sum load value (fLF+fLR), the right front and right rear sum load value (fRF+fRR), the front left and front right sum load value (fFL+fFR) or the rear left and rear right sum load value (fRL+fRrR) of the vehicle seat 1, which the adult is seated in or the child safety seat 5 is fastened to, is restored to the value that is large enough to distinguish between the adult and the child safety seat 5. Consequently, the adult and the child safety seat 5 are accurately distinguished from each other.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat occupancy determination apparatus disposed in a vehicle comprising:
   a seatbelt attachment detection device detecting engagement and disengagement of a tongue plate of a seatbelt and a buckle of the seatbelt relative to each other;
   a first load detection device and a second load detection device which are arranged at only one of left and right sides of a vehicle seat in the vehicle in a manner that the first load detection device and the second load detection device are spaced away from each other in a front-rear direction of the vehicle, each of the first load detection device and the second load detection device detecting part of a load acting on the vehicle seat;
   a control processor obtaining a first load value and a second load value which are detected at the first load detection device and the second load detection device, respectively and performing calculation, the control processor including:
      a sum load value calculation portion computing a sum load value that is computed by adding the first load value and the second load value to each other;
      a no-occupancy determination portion determining that the vehicle seat is in a no-occupancy state when the tongue plate is disengaged from the buckle and the sum load value is equal to or smaller than a no-occupancy determination threshold;
      a slope way determination portion determining that the vehicle is stopped while being inclined in a left-right direction of the vehicle, which is perpendicular to the front-rear direction of the vehicle, in a manner that the one of left and right sides is positioned at an upper side of an inclination in the left-right direction of the vehicle relative to the other of the one of left and right sides when it is determined by the no-occupancy determination portion that the vehicle seat is in the no-occupancy state;

a seatbelt attachment determination portion determining that the seatbelt is fastened when it is detected by the seatbelt attachment detection device that the tongue plate engages with the buckle after the determination is made by the slope way determination portion;

a tentative determination portion tentatively making a seat occupancy determination after it is determined by the slope way determination portion that the vehicle is stopped while being inclined and it is determined by the seatbelt attachment determination portion that the tongue plate engages with the buckle;

a forward movement determination portion determining that the vehicle starts moving forward and runs steadily on a flat ground; and a definite determination portion determining that an adult is seated in the vehicle seat when the sum load value computed by the sum load value calculation portion is equal to or larger than an adult determination threshold value that is set in advance and determining that a child safety seat is fastened to the vehicle seat when the sum load value is smaller than a child safety seat determination threshold value that is set in advance, the definite determination portion making the determination after it is determined by the forward movement determination portion that the vehicle starts moving forward and runs steadily on the flat ground, wherein the controller processor controls an airbag in the vehicle to be in a deployable state when determining that the adult is seated in the vehicle seat and controls the airbag in the vehicle to be in a non-deployable state when determining that the child safety seat is fastened to the vehicle seat.

2. The seat occupancy determination apparatus according to claim 1, wherein the slope way determination portion determines that the vehicle is stopped while being inclined in a case where the sum load value of the vehicle seat in the no-occupancy state fluctuates by a first predetermined amount or more relative to the sum load value of the vehicle seat in the no-occupancy state when the vehicle is in a horizontal state.

3. The seat occupancy determination apparatus according to claim 1, further comprising:

an inclination angle sensor configured to detect the inclination of the vehicle, wherein the slope way determination portion detects that the vehicle is stopped while being inclined on the basis of a detection value of the inclination angle sensor.

4. The seat occupancy determination apparatus according to claim 1, wherein the forward movement determination portion determines that the vehicle starts moving forward and runs steadily on the flat ground in a case where the sum load value computed when it is determined by the seatbelt attachment determination portion that the seatbelt is fastened increases by a second predetermined amount or more.

5. The seat occupancy determination apparatus according to claim 1, wherein the control processor controls an indicator lamp based upon the determination of the definite determination portion.

6. The seat occupancy determination apparatus according to claim 5, wherein the controller processor controls the indicator lamp to be ON when determining that the adult is seated in the vehicle seat and controls the indicator lamp to be OFF when determining that the child safety seat is fastened to the vehicle seat.

* * * * *